May 31, 1927.
E. GASS
1,630,700
LUBRICATING DEVICE
Filed Dec. 8, 1925
2 Sheets-Sheet 1
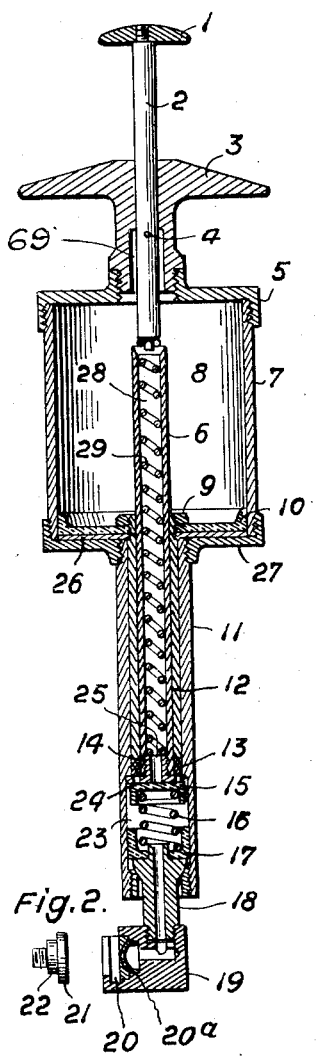
Fig. 1.
Fig. 2.
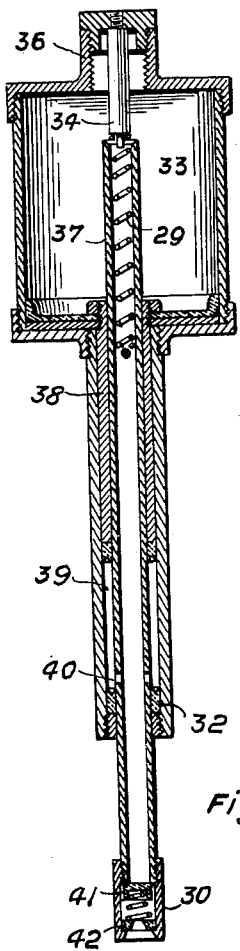
Fig. 3.
Fig. 4.
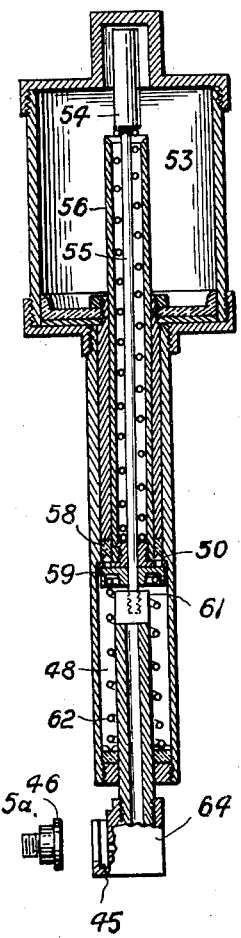
Fig. 5.
Fig. 5a.
Inventor:
E. Gass
by Langner, Parry, Card & Langner
Atty's.

May 31, 1927.
E. GASS
LUBRICATING DEVICE
Filed Dec. 8, 1925
1,630,700
2 Sheets-Sheet 2
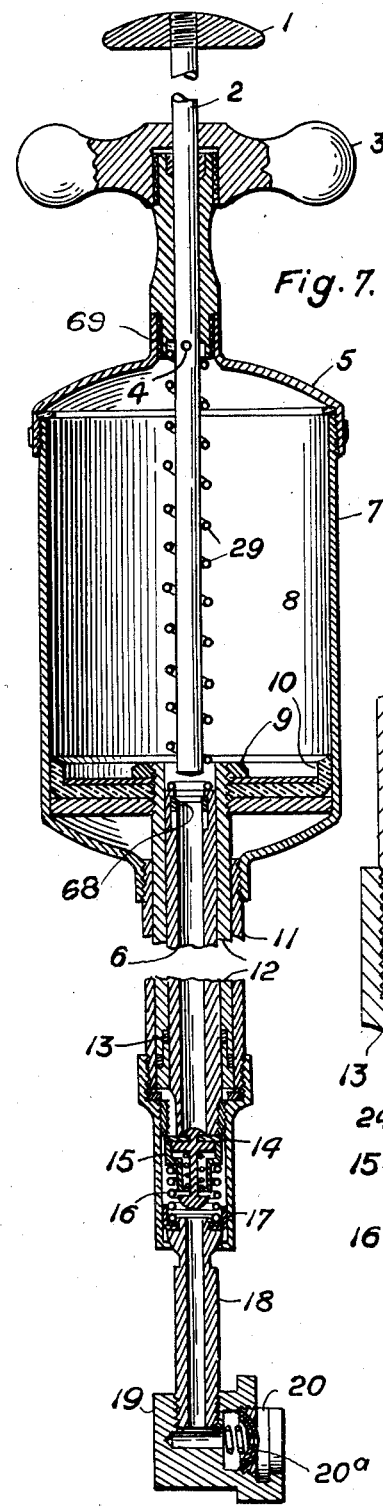
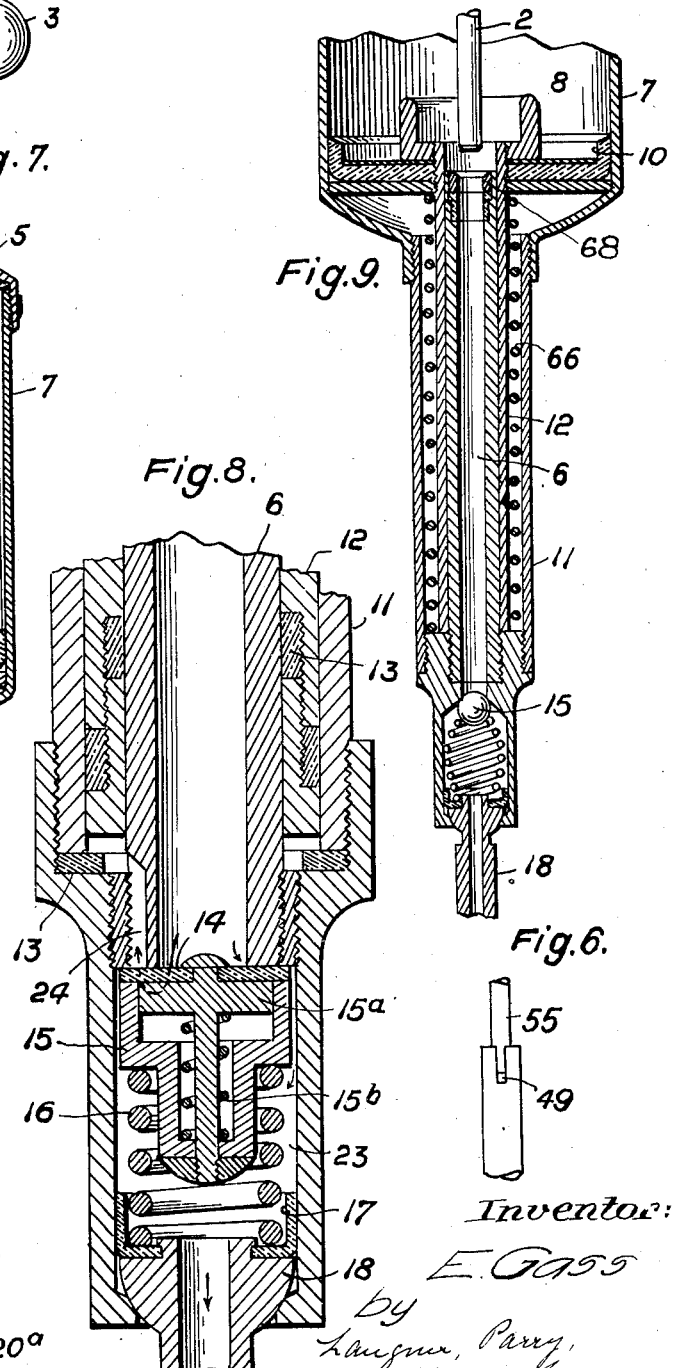
Inventor:
E. Gass
by
Langner, Parry,
Card & Langner
Att'ys Patented May 31, 1927.

1,630,700

UNITED STATES PATENT OFFICE.

ERNEST GASS, OF CLICHY, FRANCE.

LUBRICATING DEVICE.

Application filed December 3, 1925, Serial No. 74,185, and in France December 17, 1924.

The present invention relates to improvements in lubricating devices or grease guns, which make it possible to inject the lubricant into the oil-grooves or bearings, or to drive it into a place to be lubricated, under high pressure.

A device according to the invention comprises a lubricant container, which is equipped with a differential pressure piston, forming a part of a super-pressure pump by means of which the lubricant is forced into the tube system, the connecting piece and the places to be lubricated. A small portion of the lubricant is brought under high pressure and employed for operating the differential pressure piston of the lubricant container.

Some preferred constructional forms of the invention are shown by way of examples in the accompanying drawings:

Figure 1 is a longitudinal, central sectional view of a preferred embodiment of the invention.

Figure 2 shows a lubricating nipple.

The Figures 3, 4, 5 and 5ª show corresponding views of some modified constructional forms of the invention.

Figure 6 is a lateral view, illustrating the connection between the super-pressure piston and the connecting or coupling nut shown in Figure 5.

Figure 7 is a sectional view of a modified form of the embodiment shown in Figure 1.

Figure 8 shows the valve chamber and the double-acting nonreturn valve of Figure 7 on a greater scale.

Figure 9 is a sectional view of a further constructional form of the invention, at which the pressure upon the piston in the lubricant container is effected by a cylindrical spring.

The super-pressure piston 2 is equipped with a press-button 1 and is located in the handle or grip 3 of the lubricant container 7. This latter part is closed at its outer end by means of a threaded cover 5, to which the handle 3 is fastened. The outward movement of the piston 2 is limited by a stop or pin 4. In the container 7, the inner space 8 of which serves for taking up the lubricant, the super-pressure cylinder 6 and the differential piston are arranged. The large shiftable packing disc of the differential piston is fastened by means of a nut 9. The inner end of the container 7 is closed by a bottom piece 27, to which the narrow cylinder 11 of the differential piston is connected. To the disc 10 the small piston 12 of the differential cylinder is fastened. 13 is a leather packing collar for the piston 12, in which the cylinder 6 is moving which terminates in a valve seat 14. 15 is a leather nonreturn flap on the super-pressure piston and is exposed to the pressure of a spring 16. To the tube shaped cylinder 11 a tube 18 is linked, which at one end is connected to a coupling block or head 19. A leather packing 17 is arranged between the tube 18 and the cylinder 11. The head 19 is formed with a groove-shaped seat 20 adapted to take up the flange 21 of a lubricating nipple 22 (Fig. 2). A spring actuated packing cap 20ª is arranged behind the groove 20, in order to secure a tight connection. In the link chamber 23 apertures 24 for the valve is formed in the seat 14. A washer 26 is arranged between the disc 10 in the container 7 and the bottom cover 27 of the latter. A cylindrical spring 29 is arranged in the inner cylinder 6 and serves for returning the super-pressure piston 2 into its normal position in which the pin 4 abuts against the handle 3.

The device operates in the following manner: It is assumed that the container 7 and the interior hollow space 28 of the super-pressure cylinder 6 are filled with a lubricant and that the nipple of Figure 2 is at hand at the place to be lubricated. The operator catches the handle 3 with four fingers and brings the groove 20 into engagement with the flange 21 of the nipple, whereby the button 1 rests in his palm By closing the hand the piston 2 is pressed into the cylinder 6, whereby the lubricant contents of the same is compressed and through the aperture 25 passes into the chamber 23, the valve 15 being lifted from its seat by the pressure. A portion of the lubricant will also pass into the small cylinder of the differential piston, through the apertures 24 in the valve seat 14

Through the apertures or ducts in the interior of the parts 18 and 19 the lubricant in the chamber 23 is now pressed into the nipple The small amount of lubricant, which through the aperture 24 was pressed under the leather packing 13, is under a high pressure, which corresponds to the force which was exerted by the operator, which force at least must be sufficient to overcome the resistance of the spring 16.

Through the packing 13 this pressure is transmitted to the differential piston 12, which thereby moves forward and compresses the contents of the container 7. In this way the formation of air bubbles and depressions in the container is prevented.

When the lubricating process has been finished the operator relieves his hold upon the button 1, whereby the spring 29 pushes the piston 2 into its normal position. At the moment, at which the end of the piston 2 emerges from the cylinder 6, lubricant from the container 7 will be sucked into the cylinder 6, which now is under vacuum, because the flap 15 returned to its seat and closed the cylinder 6 hermetically at the beginning of the return movement of the piston 2. It is true, that the lubricant which is below the packing 13 again comes under the lower pressure corresponding to the force of the spring 16, but this is of no consequence, because the object of the differential piston nevertheless is attained, namely to suppress the air spaces in the container 7 and to keep this under a light pressure, in order to secure a regular feeding or admission of lubricant into the super-pressure cylinder.

Example: Experience has shown, that it is possible to attain a super-pressure of 250 kilo per cm².

It is assumed that the surface of the leather packing 13 sliding between the cylinders 6 and 11 is 1 cm² and that the surface of the large leather disc 10 of the differential piston is 20 cm². The pressure obtained in the container will then be:

$$\frac{250}{20} = 12,5 \text{ kilo per cm}^2$$

The normal lubrication takes place at a pressure of about 30 kilo, so that in the container a pressure of $$\frac{30}{20} = 1,5 \text{ kilo per cm}^2$$

is obtained. This is however more than sufficient to secure a pressure which is necessary for a good functioning of the apparatus.

When the container 7 is empty the leather disc 10 will join closely to the cover 5. The refilling may be effected in any of the manners described below:

1. The cover 5 is removed and the differential piston is pushed back, whereupon the container is filled with a lubricant in the usual manner.

2. The handle 3 is unscrewed and a lubricant-containing tube is screwed to the container. By exerting a pressure upon the tube, the contents of the same is forced into the container, whereby the differential piston is pushed back, against a light resistance from the lubricant which still is at hand in the small cylinder of the differential piston and is driven out through the aperture 24 and the valve 15.

This resistance will bring forth a thorough and complete filling, without air bubbles or air pockets in the lubricant. After the filling has been completed, the tube is replaced by the handle 3 and the device is again ready for use.

The device or grease gun shown in the Figures 3 and 4 operates in the same manner as that already described, but is partly of another construction.

The nipple 4 shown in Figure 4 may be conical or spherical in its upper part and is screwed to the part to be lubricated. The device is brought to rest against the lubricating nipple (Figure 4) by means of the cone or the inner ball-shaped nut, whereupon a hand is pressed against the container 33. A super-pressure cylinder 37 slides forward and backward on the piston 34. The lubricant at hand in the super-pressure cylinder 37 is compressed and escapes partly through the valve 41, which is formed of a suitable material, for instance leather. From the valve 41 the lubricant passes into the nipple 43. Under the effect of the compressed lubricant the packing 42 of the coupling nut will form an absolutely tight connection between the nipple and the walls of the part 30.

A portion of the pressure-operated lubricant passes through apertures 40 into the chamber 39 and transmits its pressure to the differential piston through the leather packing on the same. The differential piston in turn compresses the lubricant in container 33.

When the lubricating has been finished the pressure upon the container 33 is left off. Under the effect of the return spring the cylinder 37 returns into its original position and the lubricating operation can commence anew. The manner of operation is mainly the same as described with reference to Figure 1.

The parts 30 and 42 form a very simple and effective connection. The circular leather disc is formed with an interiorly situated cone of a lesser diameter than the cone of the part 30. On account of this the leather disc will be pressed somewhat backward, thereby compressing the spring slightly already before the inner cone of the part 30 has been brought into engagement with the cone 43 of the nipple. The first contact takes place on account of the spring action. The lubricant which arrives in the chamber of the coupling piece under pressure, will press the circular leather collar 42 against the inner walls of the part 30 and against the outer cone 43 of the lubricating nipple.

The more the pressure upon the lubricant is raised, the more effective the said connection will become.

The apparatus shown in the Figures 5 and 7 also operates after the same principles as the devices already described, but the construction is a different one.

The nipple of Figure 5ª is screwed to the object to be lubricated. The coupling piece 64 is connected to this lubricating nipple by letting the flange 46 slide into the groove 45. The lubricating is effected by exerting a pulling action upon the container, in a manner as if one would attempt to draw it away from the nipple. The coupling piece 64 (Figure 5) is at this constructional form connected to the super-pressure piston 55 and will effect a displacing of the latter, so that the part 54 of the super-pressure piston will immerge into the cylinder 56. The lubricant, which is compressed in the cylinder 56, is pressed into the chamber 48 through the leather valve 59. From the chamber 48 the lubricant passes through the groove 61 respectively 49 and thereupon through the ducts and the coupling piece 64 into the lubricating nipple. Before the lubricant passed into the chamber 48 however, a portion of the same passed through the aperture 50 and exerts its pressure on the leather ring, which is fastened to the differential piston. The manner of operation is otherwise the same as at the device shown in Figure 1.

The coupling piece 19 of Figure 1 may also be employed at the device shown in Figure 3, by turning the opening of the groove 20 about an angle of 180°. The groove 20 may also be placed perpendicularly to the main axis, or slightly inclined in any desired direction. The pressure button 1 and the push piston 2 of the device shown in Figure 7 are of a construction similar to that shown in Figure 1. The device consists of a lubricant container 7 having a cover 5. A displacement piston is movable in this container. A handle 3 serves as holding means, when the super-pressure piston 2 is pressed downward, and is fixedly connected to the cover 5 by being screwed to the same, or by other means. In order to effect, that the piston 2 after each downward movement automatically returns to its original position, the lower end of the said piston is connected to the spring 29. A pin 4 limits the upward movement of the piston. At the bottom of the container 7 the cylinder 11 is fastened, in which the differential piston 12 is moving.

The valve chamber and the pressure cylinder 6 are securely connected to the container, by means of a screw connection. The nonreturn valve 15 is double acting and is equipped with a small valve disc 15ª, which only has a stroke of about 1 mm. This valve disc is subjected to the action of a relatively weak spring 15ᵇ, which becomes operative before the main valve 15 yields to the super-pressure against the force of the stronger spring 16. Both valves 15 and 15ª are covered by a common packing diaphragm 14. At the lower end of the cylinder 6 slots 24 are formed, which allows the lubricant to pass below the differential piston 12. The spring 16 rests on a leather collar 17, which closes the ball-link connection of the tube 18 and the coupling piece 19—20.

The device operates in the manner described before. When the piston 2 is pressed inward, a super-pressure is created in the interior of the cylinder 6, whereby the diaphragm 14 will be deflected over a distance corresponding to the stroke of the valve 15ª. At this point lubricant will pass through the apertures 24 behind the piston 12 and press this piston as well as the displacement piston upward, whereby a super-pressure is created in the container 7. If the super-pressure in the cylinder 6 is higher, the main nonreturn valve 15 will yield, thereby opening the passage through the coupling to the place to be lubricated. At the commencement of the return movement of the piston 2 the nonreturn valve 15, and thereby also the apertures 24, are closed. The pressure behind the piston 12 does however still exist, and consequently also the super-pressure in the container 7. When the piston 2 has reached its initial position, lubricant will anew immerge into the cylinder 6, on account of the vacuum created in the same and the super-pressure in the container. The same procedure takes place repeatedly, until the displacement piston in the chamber 8 has reached its uppermost position and the container 7 has been emptied completely.

The double-acting nonreturn valve operates in a similar manner as set out in the description of the device shown in Figure 1. By opening the nonreturn valve in advance, the lubricant will be prevented from emerging through the coupling unintentionally, and otherwise no super-pressure would be created under the displacement piston and no compression would take place in the container 7. The pre-opening of the valve in the direction towards the super-pressure piston is thus of great importance for the operation of the apparatus.

The annular cross-section of the piston 12 is calculated in such a manner, that the surface pressure at normal manual operation of the apparatus, is sufficient to maintain such super-pressure in the container, as is necessary for displacing the lubricant in the pressing cylinder. The higher the counter pressure at the lubricating operation is, the higher is also the pressure, which presses the displacement piston upward so that the contents of the container is compressed and forced into the small pressing cylinder.

The differential pressure, which is created by the lubricant mass, which is pressed under the displacement piston by the double acting nonreturn valve, may be replaced by a mechanism means such as shown by way of an example in Figure 9. At this arrangement the double acting valve has been dispensed with, and the displacement piston is arranged under the influence of a cylindrical spring 66 of suitable strength, which for instance may be arranged between the cylinder 11 and the piston 12 and may act directly upon the displacement piston or upon the piston 12. In the valve chamber only the valve 15 is arranged, and when the container 7 is to be filled the displacement piston is pressed downward against the force of the spring 66 and is arrested by means of a locking mechanism. The displacement piston is, as before, connected to the piston 12 in which the cylinder 6 is located. The cylinders 6 and 11 may both be fastened to the valve casing, for instance by means of a screw connection. When the piston 2 is pressed downward, the lubricant which by the displacement piston 10 has been forced into the cylinder 6, will be pressed past the valve 15 and through the valve chamber into the place to be lubricated.

The displacement piston is thereby continually under the action of the spring 66 which presses it upward according as lubricant by the force of the spring is forced into the pressing cylinder when the inlet opening of this is given free. In this way the lubricant in the container is compressed and air pockets in the mass will not be formed. Packing means should be arranged for the push piston, f. inst. as indicated at 68 (Figs. 7 and 9). Further packings may be arranged in the open space 69 (Figs. 1 and 7) arranged at the other end of the push piston.

Common for all constructional forms of the invention is the feature, that the mass in the container is brought under such a pressure, that air bubbles in the same are prevented and that the necessary amount of lubricant instantaneously is forced into the pressure cylinder when this is released by means of the pressure piston.

I claim:

1. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its normal position after each operative stroke of the same, a differential piston consisting of a tube-shaped stem sliding on the said pressure cylinder and a piston disc adapted to move in the said lubricant container in order to keep the lubricant in the same under pressure, a tube surrounding the said tube shaped stem and being connected at one end to the said lubricant container, operating means for said differential piston and packing means surrounding the push piston at the outer end of the lubricant container.

2. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its normal position after each operative stroke of the same, a differential piston consisting of a tube-shaped stem sliding on the said pressure cylinder and a piston disc adapted to move in the said lubricant container in order to keep the lubricant in the same under pressure, a tube surrounding the said tube shaped stem and being connected at one end to the said lubricant container, operating means for said differential piston and packing means for the push piston at the outer end of the container and in the part of the said pressure cylinder opening into the lubricant container.

3. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its normal position after each operative stroke of the same, a differential piston consisting of a tube-shaped stem sliding on the said pressure cylinder and a piston disc adapted to move in the said lubricant container in order to keep the lubricant in the same under pressure, a tube connected at one end to the lubricant container and serving as a guide for the said tube shaped stem of the differential piston, operating means for the said differential piston, a valve arranged at the end of the pressure cylinder remote from the lubricant container and adapted to be opened at the downward stroke of the said push piston and packing means for the push piston at both ends of the lubricant container.

4. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its normal position after each operative stroke of the same, a differential piston consisting of a tube-shaped stem sliding on the said pressure cylinder and a piston disc adapted to move in the said lubricant container in order to keep the lubricant in the same under pressure, a tube connected at one end to the lubricant container and serving as a guide for the said tube shaped stem of the differential piston, packing means for the said push piston at both ends of the lubricant container, and communication openings in the walls of the said pressure cylinder for admitted lubricant under the lower end of the said differential piston at the downward stroke of the said push piston in order to press the same into contact with the contents of the said lubricant container.

5. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its normal position after each operative stroke of the same, a differential piston consisting of a tube-shaped stem sliding on the said pressure cylinder and a piston disk adapted to move in the said lubricant container in order to keep the lubricant in the same under pressure, a tube connected at one end to the lubricant container and serving as a guide for the said tube shaped stem of the differential piston, packing means for the said push piston, at both ends of the lubricant container, communication openings in the walls of the said pressure cylinder for admitting lubricant under the lower end of the said differential piston at the downward stroke of the said push piston in order to press the same into contact with the contents of the said lubricant container, a one way valve controlling the admission of lubricant into the openings in the wall of the said pressure cylinder and into the place to be lubricated, and a coupling member connected to the pressure cylinder.

6. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its position after each operative stroke of the same, a differential piston consisting of a tube-shaped stem sliding on the said pressure cylinder and a piston disc adapted to move in the said lubricant container in order to keep the lubricant in the same under pressure, a tube connected at one end to the lubricant container and serving as a guide for the said tube shaped stem of the differential piston, packing means for the said push piston at both ends of the lubricant container, communication openings in the walls of the said pressure cylinder for admitting lubricant under the lower end of the said differential piston, at the downward stroke of the said push piston in order to press the same into contact with the contents of the said lubricant container, a one way valve controlling the admission of lubricant into the openings in the wall of the said pressure cylinder and into the place to be lubricated, and a coupling member linkedly connected to the pressure cylinder.

7. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its normal position after each operative stroke of the same, a differential piston consisting of a tube-shaped stem sliding on the said pressure cylinder and a piston disc adapted to move in the said lubricant container in order to keep the lubricant in the same under pressure, a tube connected at one end to the lubricant container and serving as a guide for the said tube shaped stem of the differential piston, packing means for the said push piston at both ends of the lubricant container, communication openings in the walls of the said pressure cylinder for admitting lubricant under the lower end of the said differential piston at the downward stroke of the said push piston in order to press the same into contact with the contents of the said lubricant container, a one way valve, an auxiliary one way valve arranged in the same and adapted to open the communication openings to the differential piston under the influence of the initial pressure exerted by the push piston, whereas the first named valve opens the passage leading to the place to be lubricated, when the pressure has reached a certain value, a coupling head to be yieldingly connected to the place to be lubricated, a link device connecting the said coupling head to the said pressure cylinder and packing means in the said link device, for exerting a tightening effect which increases in accordance with the increasing pressure of the lubricant.

8. A grease gun, comprising in combination, a lubricant container, a pressure cylinder arranged coaxially to the said lubricant container and communicating with the same, a push piston movably arranged in the said lubricant container and adapted to be forced into the said pressure cylinder for pressing lubricant through the same into the place to be lubricated, a spring for returning the said push piston to its normal position after each operative stroke of the same, a differential piston consisting of a tube-shaped stem sliding on the said pressure cylinder and a piston disc adapted to move in the said lubricant container in order to keep the lubricant in the same under pressure, a tube connected at one end to the lubricant container and serving as a guide for the said tube shaped stem of the differential piston, packing means for the said push piston at both ends of the lubricant container, communication openings in the walls of the said pressure cylinder for admitting lubricant under the lower end of the said differential piston at the downward stroke of the said push piston in order to press the same into contact with the contents of the said lubricant container, a one way valve, an auxiliary one way valve arranged in the same and adapted to open the communication openings to the differential piston under the influence of the initial pressure exerted by the push piston, whereas the first named valve opens the passage leading to the place to be lubricated when the pressure has reached a certain value, a coupling head to be yieldingly connected to the place to be lubricated, a link device connecting the said coupling head to the said pressure cylinder, packing means in the said link device, for exerting a tightening effect which increases in accordance with the increasing pressure of the lubricant, and means for holding the grease gun during the use of the same.

In testimony whereof I have signed my name to this specification.

ERNEST GASS.